United States Patent
Nguyen

(10) Patent No.: US 6,839,854 B2
(45) Date of Patent: Jan. 4, 2005

(54) VOLTAGE REGULATION FOR COMPUTER SYSTEM COMPONENTS THAT INCREASES VOLTAGE LEVEL WHEN A COMPONENT ENTERS A SLEEP STATE AS INDICATED BY A POWER STATE STATUS SIGNAL

(75) Inventor: Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 626 days.

(21) Appl. No.: 09/940,282

(22) Filed: Aug. 27, 2001

(65) Prior Publication Data

US 2003/0041272 A1 Feb. 27, 2003

(51) Int. Cl.[7] ................................................. G06F 1/26
(52) U.S. Cl. ........................ 713/300; 323/283; 323/285
(58) Field of Search ................................ 323/283, 285; 713/300

(56) References Cited

U.S. PATENT DOCUMENTS 5,919,262 A * 7/1999 Kikinis et al. .............. 713/300
5,926,394 A * 7/1999 Nguyen et al. ................. 716/1
6,229,292 B1 * 5/2001 Redl et al. .................. 323/285
6,697,952 B1 * 2/2004 King .......................... 713/300

OTHER PUBLICATIONS

Intersil, "HIP6500B—Multiple Linear Power Controller with ACPI Control Interface", Data Sheet File No. 4870, May 2000.*
National Semiconductor, "Using Dynamic Voltage Positioning to Reduce the Number of Output Capacitors in Microprocessor Power Supplies", Application Note 1145, Jul. 2000.*

* cited by examiner

Primary Examiner—Thomas Lee
Assistant Examiner—Albert Wang
(74) Attorney, Agent, or Firm—Robert A. Diehl

(57) ABSTRACT

A computer system having multiple components capable of being in either a wake or sleep state includes a controller and a voltage regulator. The controller may generate a power state status signal indicating the power states of the components, and this signal may be provided to the voltage regulator. In response, the voltage regulator increases its output voltage level to the components when the power state status signal indicates that the components enter a sleep state.

23 Claims, 5 Drawing Sheets

VOLTAGE REGULATION FOR COMPUTER SYSTEM COMPONENTS THAT INCREASES VOLTAGE LEVEL WHEN A COMPONENT ENTERS A SLEEP STATE AS INDICATED BY A POWER STATE STATUS SIGNAL

The present invention relates to computer systems and more particularly to reducing overall transient voltage ranges of a supply voltage from a voltage regulator resulting from variations in the supply current from the voltage regulator.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of electric power drawn by a computer system is to design the system such that it is capable of operating in two different modes. In a first mode of operation, only the most vital functions of the system, such as those dedicated to monitoring for user input, are active. This may be referred to as a "sleep mode." During the sleep mode, the computer system draws very little power from the voltage regulator (alternatively referred to as the power/voltage/Vcc supply or power/voltage/Vcc source). In a second mode of operation, the computer system is busy executing instructions to accomplish a particular task. This is referred to as the "wake mode." During the wake mode, the computer system consumes a significant amount of power from the power supply.

Unfortunately, there is a side effect associated with switching a computer system between sleep and wake modes. The rapid change in current drawn from the power supply when the computer switches between modes causes fluctuations in the voltage supplied to the computer by the voltage regulator. Going from a wake mode to a sleep mode may cause a rapid decrease in current, resulting in an upwardly spiking voltage transient. Similarly, going from a sleep mode to a wake mode may cause a rapid increase in current, resulting in a downwardly spiking voltage transient.

The present invention addresses this and other issues associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

Figure 1:
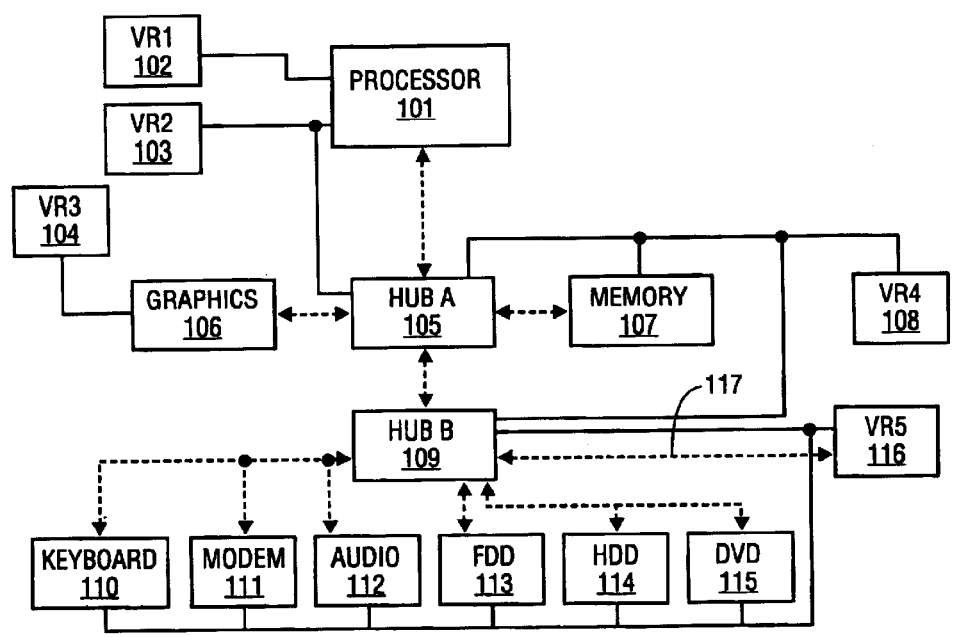
FIG. 1 includes a computer system formed in accordance with an embodiment of the present invention.

In accordance with an embodiment of the present invention, a voltage regulator supplies power (alternatively referred to as a voltage level or Vcc level) to multiple devices within a computer system. The voltage level from the voltage regulator may be maintained at a first voltage level that is below the nominal voltage level of the regulator while the devices are in a wake state. In doing so, less power is consumed by the computer system because power consumption is proportional to the square of the voltage level. The voltage level from the voltage regulator may then be increased to a second voltage level when the devices switch to a sleep state. The output of the voltage regulator may be set to an intermediate voltage level, between the first and second voltage levels, when some of the devices are in a wake state and some of the devices are in a sleep state.

Wake and sleep states of the devices are indicated by a power state status signal provided to the voltage regulator. The associated output voltage levels from the voltage regulator are predetermined to be values that will maintain the voltage levels within an appropriate tolerance range despite voltage transients. These voltage transients are the expected result of current fluctuations associated with transitions between wake and sleep states of the devices. A more detailed description of embodiments of the present invention, including various configurations and implementations, is provided below.

As used herein, the terms "wake" and "sleep" are relative indications of the power state of a device. A device in a wake state may generally consume more power, on average, than the same device in a sleep state. In accordance with one embodiment of the present invention, a device in a wake state is either in an operational state or is ready for operation (i.e. receiving, transmitting, or accessing data or ready to receive, transmit, or access data). A device in a sleep state is in a non-operational state. For example, a hard drive, floppy drive, or DVD may be considered to be in a wake state while it's storage medium is spinning and in a sleep state while it's storage medium is not spinning (or is spinning at a speed that is less than a predetermined speed).

For one embodiment of the present invention, the terms "wake" and "sleep" may be interpreted in accordance with the ACPI specification (Advanced Configuration and Power Interface Specification, Rev. 2.0, published Jul. 27, 2000, by Compaq, Intel, Microsoft, Phoenix, and Toshiba), but is not to be so limited. Note that what is referred to herein as a sleep state may alternatively be referred to as an inactive, power-down, deep power-down, deep sleep, low-power, or idle state.

In accordance with one embodiment of the present invention, the power state status signal provided to the voltage regulator to indicate wake and sleep states of the devices in the computer system may be a signal defined by the ACPI specification. For example, the power state status signal may be the SLP_S3# signal, as described in the ACPI specification. Alternatively, the power state status signal may be any signal generated by any controller within the computer system to indicate the power state of individual or multiple devices within the system. This controller may reside centrally within a hub or bridge (often contained in a chipset) of a computer system (as described in more detail below), or, alternatively, it may reside centrally within another device of the computer system, or as a discrete component. In accordance with an alternate embodiment, it may be distributed across multiple devices or discrete components of the computer system. For example, each device coupled to a voltage regulator may send its own power state status signal separately to the voltage regulator to indicate its power state.

It is to be noted that the power state status signal proved to the voltage regulator may indicate a power state change of an associated device (or of multiple devices) before, after, or during the power state transition of the device. As used herein, the term "when" is used to indicate the temporal nature of any of these power state transitions. For example, the phrase "a signal is sent to the voltage regulator when the device enters the sleep state" is to be interpreted to mean that the signal may be sent before, after, or during the transition into the sleep state, but is nonetheless associated with that transition into the sleep state.

FIG. 1 includes a computer system formed in accordance with an embodiment of the present invention. Processor 101 is coupled to Hub A 105 to communicate with memory 107, graphics device 106, and Hub B. Hub B is, in turn, coupled to several peripheral input/output devices, including, for example, keyboard 110, modem 111, audio device 112, floppy disk drive 113, hard disk drive 114, and DVD 115. The computer system of FIG. 1 additionally includes multiple voltage regulators (VRs) to supply power at different voltage levels to the various components of the system. For example, VR1 102 supplies power to processor 101. VR2 103 supplies power to both processor 101 and to Hub A 105. VR3 104 supplies power to graphics device 106. VR4 105 supplies power to Hub A 105, memory 107, and to Hub B 109. VR5 116 also supplies power to Hub B 109 as well as to keyboard 110, modem 111, audio device 112, floppy disk drive 113, hard disk drive 114, and DVD 115.

Note that some voltage regulators supply power to a single component while other voltage regulators supply power to multiple components. In addition, some components receive a voltage supply from only a single voltage regulator while other components receive multiple voltage supplies from multiple voltage regulators. It is to be appreciated that in accordance with alternate embodiments of the present invention, alternate couplings of voltage regulators to these and other components of a computer system may be implemented.

Multiple components of the computer system of FIG. 1 may be capable of entering wake and sleep states. For example, as described above, hard disk drive 114 and DVD 115 may be considered to be in a sleep state when their respective storage mediums are not spinning. Other components, such as processor 101, may have various wake and sleep states. For example, processor 101 may have a fully operational wake state, a partially operational wake state, a partial sleep state, a regular sleep state, a deeper sleep state, etc. These different levels of wake and sleep states may have various current consumption levels associated with them.

In accordance with an embodiment of the present invention, the power state status of the various components of the computer system of FIG. 1 may be indicated to one or more voltage regulators to appropriately set the output voltage levels supplied to the components. The power state status may be provided to a voltage regulator by a power state status signal via a power state status signal line. For example, the power state of peripheral devices 110–115 of FIG. 1 may be indicated to VR5 116 by a power state status signal via power state status signal line 117.

In accordance with one embodiment of the present invention, the power state status signal provided to VR5 116 via signal line 117 of FIG. 1 indicates the power state of multiple ones of peripheral devices 110–115. For example, in accordance with an embodiment in which the power state status signal is the SLP_S3# signal in an ACPI-compliant computer system, the power state status signal may indicate the power state of drives 113–115, collectively. In accordance with an alternate embodiment of the present invention, the power state status signal is a serial or parallel signal that indicates the power state of various components independently, collectively, or in any grouping.

Figure 2:
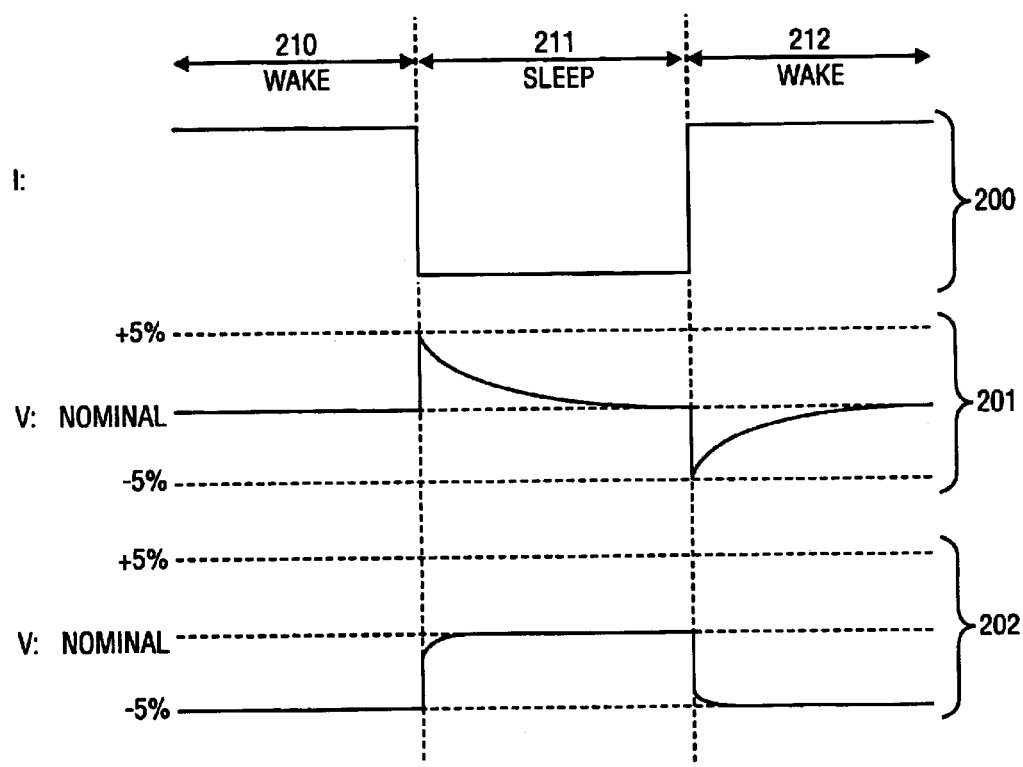
FIG. 2 includes a timing diagram in accordance with an embodiment of the present invention.

FIG. 2 includes a timing diagram of the current and voltage from a voltage regulator to a plurality of components of a computer system in accordance with an embodiment of the present invention. The current from the voltage regulator is shown in timing diagram 200. As shown, during period of time 210 in diagram 200, the components powered by the voltage regulator are in a wake state and consume a first amount of current. During period of time 211, the components are in a sleep state and consume a lesser amount of current. During period of time 212, the components reenter the wake state and again consume the first amount of current.

Conventionally, the voltage level output of the voltage regulator is set to the nominal voltage, as shown in timing diagram 201 of FIG. 2. This nominal voltage may be, for example, five volts, but may alternatively be any target voltage sufficient to power the components supplied by the voltage regulator. Typically, there is a tolerance range within which the voltage level output of the voltage regulator may fluctuate while still enabling the associated components to operate properly and allowing the computer system to perform within established electrical, thermal, and other specified limits. As shown in FIG. 2, this tolerance range may be +/−5% of the nominal voltage level. This tolerance range may vary in alternate embodiment of the present invention, and may not necessarily be symmetrical about the nominal voltage level.

When the power state of components of the computer system transitions from a wake state 210 to a sleep state 211, an upwardly spiking voltage transient occurs as shown in timing diagram 201 of FIG. 2. The computer system is designed such that this upwardly spiking voltage transient remains within the tolerance range. When the power state of components of the computer system transitions from a sleep state 211 to a wake state 212, a downwardly spiking voltage transient occurs as shown in timing diagram 201. The computer system is designed such that this downwardly spiking voltage transient remains within the tolerance range.

In accordance with an embodiment of the present invention, a power state status signal is used to regulate the target voltage level from the voltage regulator in a manner that reduces the power consumption of the computer system. For example, as shown in timing diagram 202 of FIG. 2, the voltage level output from the voltage regulator may be set at or near the lower end of the tolerance range while the components are in a wake state during period of time 210, as indicated to the voltage regulator by a power state status signal. For an alternate embodiment of the present invention, this voltage level may be set to any intermediate value between the lower end of the tolerance range and the nominal voltage level during period of time 210. When the components transition to the sleep state during period of time 210, the voltage level output from the voltage regulator may spike up. This transition is indicated to the voltage regulator by the power state status signal.

Instead of dropping back to the initial voltage level, the voltage level target may be reset to a higher value during period of time 211, as shown in timing diagram 202 of FIG. 2. In accordance with one embodiment of the present invention, this higher value may be at or near the nominal voltage level. In accordance with an alternate embodiment of the present invention, this voltage level may be at or near a voltage level that can accommodate a downwardly spiking voltage transient without allowing the voltage level to fall below the lower end of the tolerance range.

As shown in timing diagram 202 of FIG. 2, when the components transition back to the wake state during period of time 212, as indicated by a power state status signal to the voltage regulator, the voltage level output from the voltage regulator may spike down, but remains within the tolerance range. Instead of dropping back to the voltage level set during period of time 211, the voltage level target may be reset to a different value during period of time 212. As shown in timing diagram 202, this value may be the initial voltage level set during wake period 210, near the lower end of the tolerance range.

Figure 3:
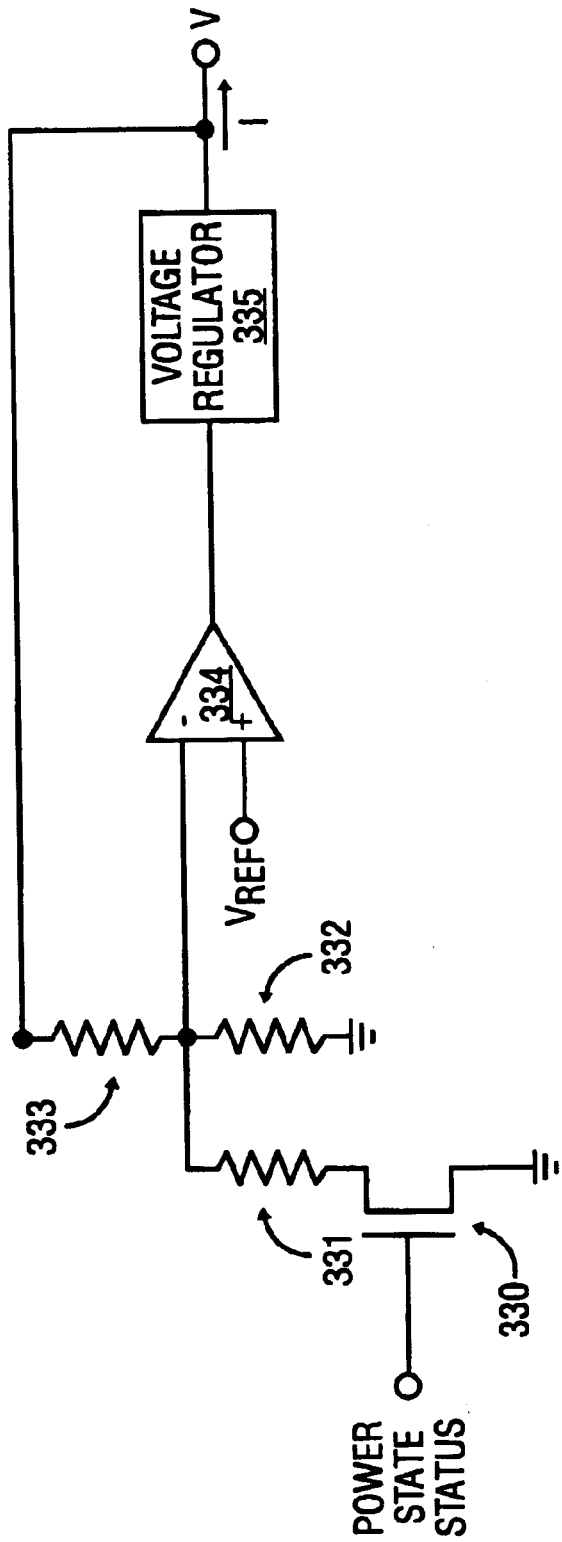
FIG. 3 includes a circuit in accordance with an embodiment of the present invention.

FIG. 3 includes a circuit in accordance with an embodiment of the present invention. The circuit of FIG. 3 is the voltage regulator that supplies power to a computer system formed in accordance with an embodiment of the present invention. The power state status signal may be coupled to the gate of n-channel transistor 330. The source of transistor 330 is coupled to ground while its drain is coupled to one end of resistor 331. The opposite end of resistor 331 is coupled to the inverting input of comparator 334. The non-inverting input to comparator 334 is coupled to a constant reference voltage Vref. The output of comparator 334 is coupled to an input of voltage regulator 335. the output of voltage regulator 335 is fed back to the inverting input of comparator 334 through resistor 333. The inverting input to comparator 334 is coupled to ground through resistor 332.

When the inverting input to comparator 334 of FIG. 3 falls below the reference voltage Vref, the output of comparator 334 sends a signal to voltage regulator 335 to increase the voltage V at its output. Conversely, when the inverting input to comparator 334 is raised above the voltage value Vref, comparator 334 sends a signal to voltage regulator 335 to reduce the voltage V at its output. In this manner, the voltage V supplied by the voltage regulator to the components of the computer system is regulated and held at a relatively constant value. Note that in the interest of clarity, voltage regulator 335 is merely represented in block form. The boundaries of voltage regulator block 335 have been arbitrarily selected in the manner shown to highlight the relationship between the power state status signal and its effect on the output voltage level of the voltage regulator. The voltage regulator of the computer system may alternatively be defined to include any or all of components 330–334. For this reason, it is understood that sending the power state status signal to the gate of transistor 330 is equivalent to stating that the signal is simply sent to the voltage regulator itself.

In accordance with one embodiment of the present invention, Vref is set at or near the lower end of the tolerance range of the voltage regulator. The power state status signal may be driven high to indicate that the associated components of the computer system are in a sleep state, and driven low to indicate that the associated components of the computer system are in a wake state. Alternatively, the circuit of FIG. 3 may be redesigned to accommodate a power state status signal that is driven high to indicate a wake state and driven low to indicate a sleep state.

Alternatively, the circuit of FIG. 3 may be modified to include a storage element, such as a latch, to store one or more bits indicating power state statuses of associated components of the computer system. For another embodiment of the present invention, the circuit of FIG. 3 may be redesigned to accept additional power state status signals associated with other components, the power to which is supplied by voltage regulator 335. For this embodiment, more than two different output voltage levels may be generated by the voltage regulator, as described in more detail below.

Figure 4:
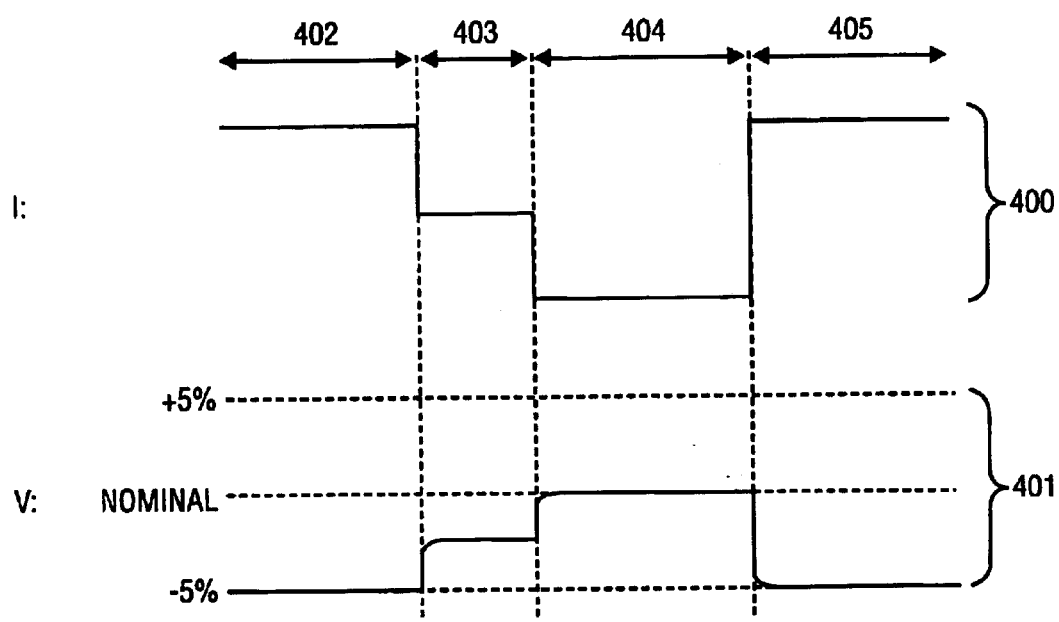
FIG. 4 includes a timing diagram in accordance with another embodiment of the present invention.

FIG. 4 includes a timing diagram of the current and voltage from a voltage regulator to a plurality of components of a computer system in accordance with another embodiment of the present invention. The current from the voltage regulator is shown in timing diagram 400. As shown, during period of time 402 in diagram 400, the components powered by the voltage regulator are in a wake state and consume a first amount of current. During period of time 403, some components enter a sleep state and consume a lesser amount of current while other components remain in a wake state, resulting in a total consumption of a second amount of current that is less than the first amount of current. During period of time 404, more components enter the sleep state, resulting in a further decrease in the amount of current consumed. During period of time 405, the components reenter the wake state and again consume the first amount of current.

In accordance with an embodiment of the present invention, a power state status signal is used to regulate the target voltage level from the voltage regulator in a manner that reduces the power consumption of the computer system. For example, as shown in timing diagram 401 of FIG. 4, the voltage level output from the voltage regulator may be set at or near the lower end of the tolerance range while the components are in a wake state during period of time 402, as indicated to the voltage regulator by a power state status signal. This assumes most of the high current drawing components are in the wake state during period of time 402. In accordance with an alternate embodiment of the present invention, this voltage level may be at or near a voltage level that can accommodate a downwardly spiking voltage transient without allowing the voltage level to fall below the lower end of the tolerance range.

When some of the components transition to the sleep state during period of time 403, the voltage level output from the voltage regulator may spike up as shown in timing diagram 401. This transition is indicated to the voltage regulator by the power state status signal.

Instead of dropping back to the initial voltage level, the voltage level target may be reset to a higher value during period of time 403, as shown in timing diagram 401 of FIG. 4. In accordance with one embodiment of the present invention, this higher value may be at some intermediate position between the lower end of the tolerance range and the nominal voltage level. In accordance with an alternate embodiment of the present invention, this voltage level may be at or near a voltage level that can accommodate a downwardly spiking voltage transient without allowing the voltage level to fall below the lower end of the tolerance range. When additional components transition to the sleep state during period of time 404, the voltage level output from the voltage regulator may spike up again, as shown in timing diagram 401. This transition is also indicated to the voltage regulator by the power state status signal.

The voltage level target may again be reset to an even higher value during period of time 404, as shown in timing diagram 401 of FIG. 4. In accordance with one embodiment of the present invention, this higher value may be at or near the nominal voltage level, assuming most of the high current drawing components are in the sleep state during period of time 404. In accordance with an alternate embodiment of the present invention, this voltage level may be at or near a voltage level that can accommodate a downwardly spiking voltage transient without allowing the voltage level to fall below the lower end of the tolerance range.

As shown in timing diagram 401 of FIG. 4, when the components transition back to the wake state during period of time 405, as indicated by a power state status signal to the voltage regulator, the voltage level output from the voltage regulator may spike down, but remains within the tolerance range. Instead of dropping back to the voltage level set during period of time 404, the voltage level target may be again reset to a different value during period of time 405. As shown in timing diagram 401, this value may be the initial voltage level set during wake period 401, near the lower end of the tolerance range, assuming most of the high current drawing components are in the wake state during period of time 405. In accordance with an alternate embodiment of the present invention, this voltage level may be at or near a voltage level that can accommodate a downwardly spiking voltage transient without allowing the voltage level to fall below the lower end of the tolerance range.

Figure 5:
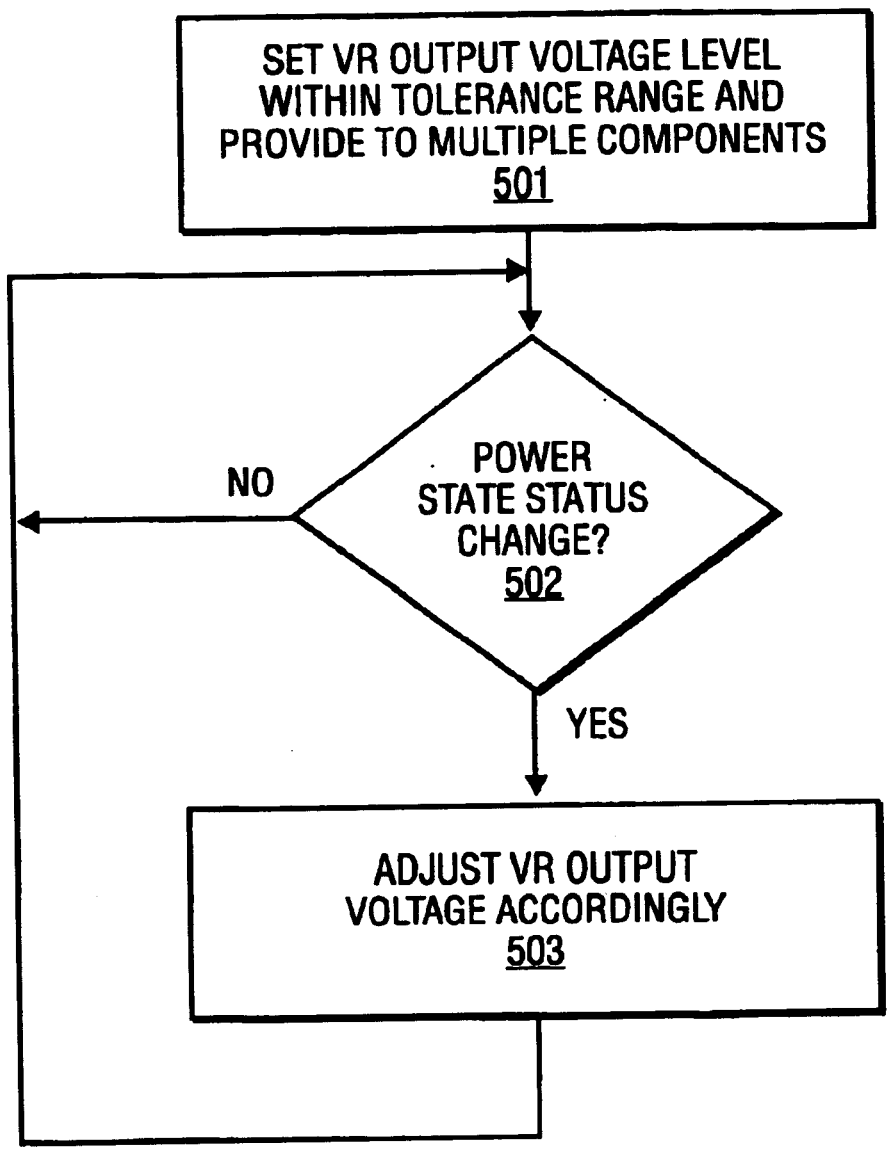
FIG. 5 includes a flow chart showing a method of the present invention.

FIG. 5 includes a flow chart showing a method of the present invention. At step 501, the output of the voltage regulator is set to a voltage level within the tolerance range and is provided to multiple components of a computer system. In accordance with one embodiment of the present invention, this voltage level may be at or near a voltage level that can accommodate a downwardly spiking voltage transient without allowing the voltage level to fall below the lower end of the tolerance range. For one embodiment of the present invention, to reduce power consumption, this voltage level is set below the nominal voltage level.

At step 502, a power state status signal is sent to the voltage regulator indicating that the power state status of one or more components of the computer system has changed. At step 503, the output voltage level of the voltage regulator is adjusted accordingly. That is, in accordance with one embodiment of the present invention, the target output voltage level of the voltage regulator may be raised if the power state status signal indicates that one or more components of the computer system have entered a sleep mode. Similarly, the target output voltage level of the voltage regulator may be lowered if the power state status signal indicates that one or more components of the computer system have entered a wake mode.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system comprising:
   a controller to generate a power state status signal to indicate a power state of each of a plurality of components of the computer system; and
   a voltage regulator to supply a first voltage level for the plurality of components and to increase to second voltage level for the plurality of components when a first component of the plurality of components enters a sleep state, as indicated by the power state status signal corresponding to the first component to further increase to a third voltage level for the plurality of components when a second component of the plurality of components enters a sleep state, as indicated by the power state status signal corresponding to the second component.

2. The computer system of claim 1, wherein the voltage regulator is to decrease to the first voltage level when all of the plurality of components enter a wake state, as indicated by the power state status signals.

3. The computer system of claim 1, wherein each of the power state status signal is an $SLP_{13}S3\#$ signal.

4. The computer system of claim 1, wherein the plurality of components includes a hard disk drive.

5. A computer system comprising:
   a controller to generate a power state status signal to indicate a power state of a first plurality of components of the computer system; and
   a voltage regulator to supply a voltage level to the first plurality of components and to increase the voltage level to the first plurality of components when the first plurality of components enters a sleep state, as indicated by the power state status signal, wherein the power state status signal is to further indicate a power state of at least a second component, the voltage regulator to supply the voltage level to the second component and to increase the voltage level to both the second component and to the first plurality of components when the first plurality of components enters a sleep state and a power state of the second component remains unchanged.

6. A The computer system of claim 5 wherein the power state of the second component that remains unchanged is a sleep state.

7. The computer system of claim 5, wherein the power state of the second component that remains unchanged is a wake state.

8. The computer system of claim 5, wherein the voltage regulator is to decrease the voltage level to both the second component and to the first plurality of components when the first plurality of components enters a wake state and a power state of the second component remains unchanged.

9. A computer system comprising:
   a controller to generate a power state status signal to indicate a power state of a first plurality of components of the computer system; and
   a voltage regulator to supply a voltage level to the first plurality of components and to increase the voltage level to the first plurality of components when the plurality of components enters a sleep state, as indicated by the power state status signal, wherein the power state status signal is to further indicate a power state of at least a second component, the voltage regulator to supply the voltage level to the second component and to increase the voltage level to both the second component and to the first plurality of components when the second component enters a sleep state and a power state of the first plurality of components remains unchanged.

10. The computer system of claim 9, wherein the power state of the first plurality of components that remains unchanged is a sleep state.

11. The computer system of claim 9, wherein the power state of the first plurality of components that remains unchanged is a wake state.

12. The computer system of claim 9, wherein the voltage regulator is to decrease the voltage level to both the second component and to the first plurality of components when the second component enters a wake state and a power state of the first plurality of components remains unchanged.

13. A computer system comprising:
a controller to generate a power state status signal to indicate a power state of a first plurality of components of the computer systems;
a voltage regulator to supply a voltage level to the first plurality of components and to increase the voltage level to the first plurality of components when the first plurality of components enters a sleep state, as indicated by the power state status signal;
a processors; and
a hub coupled between the processor and the first plurality of components, the hub being coupled to the voltage regulator arid including the controller.

14. A computer system comprising:
a controller to generate a power state status signal to indicate a power state of a first plurality of components of the computer system; and
a voltage regulator to supply a voltage level to the first plurality of components and to increase the voltage level to the first plurality of components when the first plurality of components enters a sleep state, as indicated by the power state status signal, wherein at least a portion of the controller is distributed among the first plurality of components.

15. A voltage regulator comprising:
an input to receive a power state status signal to indicate power states of first and second components of a computer system; and
an output to supply a first voltage level to the first and second components during a first period of time and to supply a second voltage level to the first and second components during a second period of time if the power state status signal indicates that the first and second components are in a first power state during the first period of time and the power state status signal indicates that the first and second components are in the first and second power states, respectively, during the second period of time.

16. The voltage regulator of claim 15, wherein the first voltage level is lower than the second voltage level, the first power state is a wake state, and the second power state is a sleep state.

17. The voltage regulator of claim 15, wherein the first voltage level is higher than the second voltage level, the first power state is a sleep state, and the second power state is a wake state.

18. The voltage regulator of claim 15, wherein the first and second voltage levels are below the nominal voltage level associated with the first and second components.

19. The voltage regulator of claim 15, further comprising a storage element to store information associated with the power state status signal.

20. A method comprising:
generating a power state status signal to indicate a power state of a plurality of components of a computer system;
increasing a voltage level supplied to the plurality of components if the power state status signal indicates that a first component of the plurality of components transitions from a wake state to a sleep state; and
further increasing the voltage level supplied to the plurality of components if the power state status signal indicates that a second component of the plurality of components transitions from a wake state to a sleep state.

21. The method of claim 20, further comprising decreasing the voltage level supplied to the plurality of components if the power state status signal indicates that the first component of the plurality of components transitions from a sleep state to a wake state.

22. The method of claim 20, further comprising decreasing the voltage level supplied to the plurality of components if the power state status signal indicates that a third component of the plurality of components transitions from a sleep state to a wake state.

23. The method of claim 20, wherein generating a power state status signal includes generating a $SLP_{13}S3\#$ signal.

* * * * *

UNITED STATES PATENT AND TRADEMARK OFFICE
CERTIFICATE OF CORRECTION

PATENT NO. : 6,839,854 B2
DATED : January 4, 2005
INVENTOR(S) : Nguyen

It is certified that error appears in the above-identified patent and that said Letters Patent is hereby corrected as shown below:

Column 8,
Line 7, before "second", insert -- a --.
Line 22, delete "signal" and insert -- signals --.
Line 22, delete "$SLP_{13}S3\#$" and insert -- SLP_S3# --.

Column 9,
Line 24, delete "processors" and insert -- processor --.
Line 27, delete "arid" and insert -- and --.

Column 10,
Line 45, delete "$SLP_{13}S3\#$" and insert -- SLP_S3# --.

Signed and Sealed this

Seventeenth Day of May, 2005

JON W. DUDAS
*Director of the United States Patent and Trademark Office*